United States Patent
Hess et al.

(10) Patent No.: US 6,901,910 B2
(45) Date of Patent: Jun. 7, 2005

(54) METHOD AND DEVICE FOR CONTROLLING A DRIVE UNIT

(75) Inventors: Werner Hess, Stuttgart (DE); Juergen Pantring, Schwieberdigen (DE); Dirk Hartmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/380,332

(22) PCT Filed: Jul. 9, 2002

(86) PCT No.: PCT/DE02/02505

§ 371 (c)(1),
(2), (4) Date: Mar. 13, 2003

(87) PCT Pub. No.: WO03/006807

PCT Pub. Date: Jan. 23, 2003

(65) Prior Publication Data

US 2003/0187566 A1 Oct. 2, 2003

(30) Foreign Application Priority Data

Jul. 13, 2001 (DE) .......................... 101 33 405

(51) Int. Cl.⁷ ................................ F02M 7/00
(52) U.S. Cl. .................. 123/436; 123/352; 123/399; 701/110
(58) Field of Search .................... 123/436, 352–355, 123/361, 399, 358; 701/110, 111

(56) References Cited

U.S. PATENT DOCUMENTS

| 5,477,827 A | 12/1995 | Weisman et al. |
| 6,154,688 A | * 11/2000 | Dominke et al. ............. 701/1 |
| 6,223,721 B1 | * 5/2001 | Bauer et al. ............... 123/446 |

FOREIGN PATENT DOCUMENTS

| DE | 28 49 554 | 6/1980 |
| DE | 42 39 711 | 6/1994 |
| DE | 197 39 567 | 3/1999 |
| DE | 100 48 015 | 10/2001 |
| GB | 2 041 577 | 9/1980 |

* cited by examiner

Primary Examiner—John T. Kwon
(74) Attorney, Agent, or Firm—Walter Ottesen

(57) ABSTRACT

A method and an arrangement for controlling the drive unit of a vehicle are suggested. A decentral torque coordination is provided. In addition to the resulting input quantity of the first coordinator, also, if required, resulting minimum quantities and/or maximum quantities are transmitted from a first coordinator to a second coordinator.

22 Claims, 3 Drawing Sheets

METHOD AND DEVICE FOR CONTROLLING A DRIVE UNIT

This application is the national stage of PCT/DE 02/02505, filed Jul. 9, 2002, designating the United States.

FIELD OF THE INVENTION

The invention relates to a method and an arrangement for controlling a drive unit.

BACKGROUND OF THE INVENTION

A procedure for controlling a drive unit is known from U.S. patent application publication 2003/0100405. In this procedure, input quantities, preferably desired torque values for the drive unit from various sources, are coordinated to a resulting desired torque. The drive unit is controlled in dependence upon a desired quantity resulting from these different desired quantities. This known coordination is decentral, that is, the coordination takes place in several independent steps. The resultant of the first stage is the input quantity of the second stage, et cetera. In the embodiment shown, desired quantities, which are independent of the type of drive unit, are coordinated in a first coordinating stage and desired quantities, which are drive unit specific, are coordinated in a second coordination stage. The resultant of the first stage is the input quantity of the second stage.

Here, diverse physical quantities within a motor vehicle are formulated as a request, especially as a torque request to the drive unit. These quantities, for example, include: the driver command; an rpm limitation; a speed limitation; a road speed control; a transmission protection and/or component protection; the intervention of the following: a stability program; a drive slip control; and/or, a drive drag torque control, et cetera. For this reason, the drive unit can be viewed as a component of the vehicle, as an intelligent actuating element for converting such requests. The requests themselves can be assigned to different functional units within the vehicle. Often, these functional units are characterized by their own control apparatus, for example, a stability program or transmission control. This hardware partitioning has, as a rule, grown historically and is therefore not absolutely required.

In present day engine controls, these requests (torque requests), increasing ones as well as decreasing ones, are coordinated in a central function module. An example is shown in DE-A 197 39 567. There, in addition to the torque requests, also all torque limitations are known so that it is ensured that permissible operating limits are not exceeded for engine and total vehicle. Accordingly, an engine desired torque is formed via a targeted sequence of minimum and maximum selection function blocks which does not exceed the permissible operating limits. In a minimum selection block, a minimum selection of the input quantities and therefore a limiting of the torque-reducing interventions takes place; whereas, in a maximum value selection block, a maximum selection of input quantities takes place and therefore increasing interventions are limited.

In the above-mentioned proposal of a partitioning, torque requests are also decentrally evaluated and coordinated via the functional structuring in the vehicle composite. The result of this decentral coordination is then a torque request to the drive unit. Subsequent torque coordinations receive no information as to the source of the torque request. However, if only coordinated desired torques without additional information are transmitted to downstream coordination stages, then the problem arises that a desired torque is pregiven in the downstream coordination which violates the torque limit of a previous coordination.

Accordingly, it is desirable that it is ensured in a decentral torque coordination that no operating limit of a component system and no operating limit of the total system are violated.

SUMMARY OF THE INVENTION

In a decentral torque coordination, also the torque limits, which are to be observed, are transmitted in addition to the resulting desired torque and are considered in the downstream coordinate stages. For this reason, it is effectively avoided that operating limits of component systems and operating limits of the total system are violated.

BRIEF DESCRIPTION OF THE DRAWINGS

The invention will now be explained in greater detail with reference to the embodiments shown in the drawing.

DESCRIPTION OF THE PREFERRED EMBODIMENTS OF THE INVENTION

Figure 1:
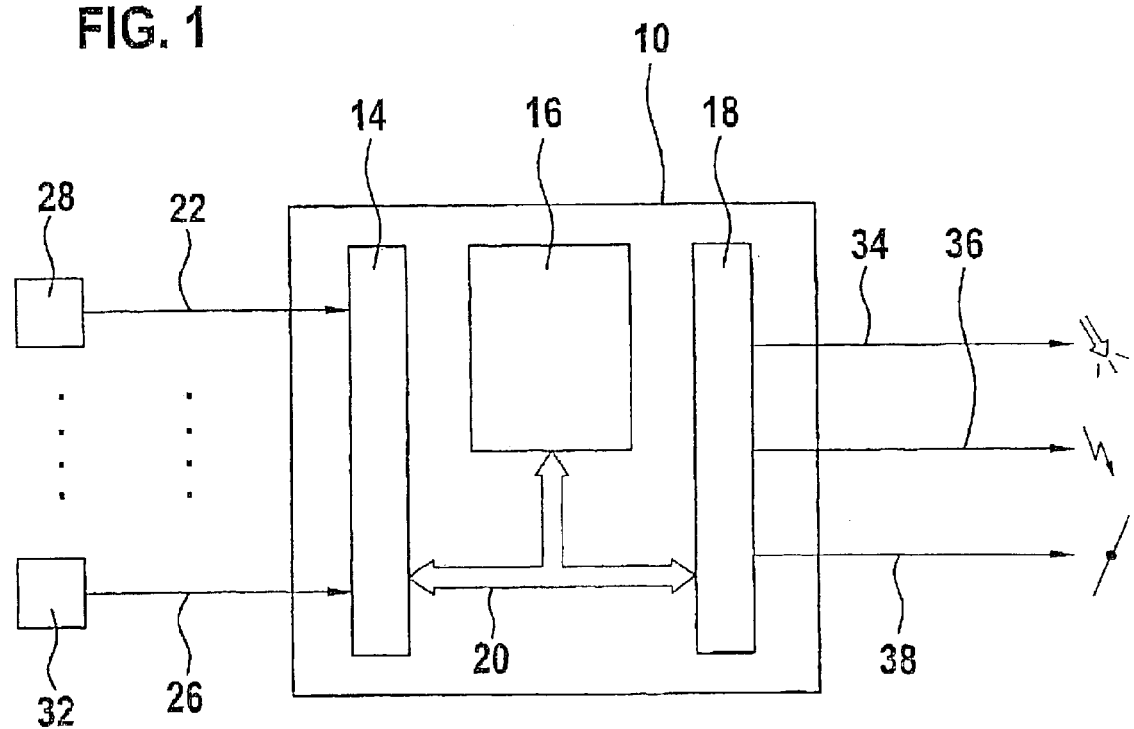
FIG. 1 shows an overview circuit diagram of a control arrangement for controlling a drive unit.

FIG. 1 shows a block circuit diagram of a control arrangement for controlling a drive unit, especially of an internal combustion engine. A control unit 10 is provided which includes, as components, an input circuit 14, at least one computer unit 16 and an output circuit 18. A communication system 20 connects these components for the mutual exchange of data. Input lines 22 to 26 are connected to the input circuit 14 of the control unit 10. In a preferred embodiment, these input lines are configured as a bus system and signals are supplied via this bus system to the control unit 10. These signals represent operating variables to be evaluated for controlling the drive unit. These signals are detected by measuring devices 28 to 32. Operating variables of this kind are: accelerator pedal position, engine rpm, engine load, exhaust-gas composition, engine temperature, et cetera. The control unit 10 controls the power of the drive unit via the output circuit 18. This is symbolized in FIG. 1 with the output lines 34, 36 and 38 via which the following are actuated: the fuel mass to be injected; the ignition angle of the internal combustion engine as well as at least one electrically actuable throttle flap to adjust the air supply to the internal combustion engine. In addition to the described input quantities, further control systems of the vehicle are provided which transmit input quantities to the input circuit 14, for example, torque desired values. Such contral systems are, for example, drive slip controls, driving dynamic controls, transmission controls, engine drag torque controls speed controller, speed limiter, et cetera. The following are adjusted via the illustrated actuating paths: the air supply to the internal combustion engine; the ignition angle of the individual cylinders; the fuel mass Lu be injected; the injection time point; and/or, the air/fuel ratio, et cetera. In addition to the illustrated desired value inputs, the external desired value inputs (to which also the desired value inputs from the driver in the form of a drive command and a maximum speed limitation belong), internal input quantities for controlling the drive unit are present, for example, a torque change of an idle control, an rpm limitation, which outputs a corresponding desired input quantity, a torque limitation, a function for component protection, a protection against stalling, et cetera.

The described procedure is not only applicable in combination with internal combustion engines but also in other drive concepts, for example, electric motors. In this case, the actuating quantities are to be correspondingly adapted.

In the preferred embodiment, torque quantities are used as desired value input quantities. In other embodiments, other quantities such as power, rpm, et cetera, are pregiven as desired values with appropriate adaptation. These quantities relate to output quantities of the drive unit.

The coordination of these different requests is decentral. In one embodiment, the first desired quantities in a first coordination stage are compared to each other, for example, in the context of a minimum value selection step and a maximum value selection step. As a result, a resulting desired quantity is transmitted further. In the initially-mentioned known embodiment, these desired quantities define engine-independent intervention quantities such as driver command torque, the desired torque of a road speed controller or of an adaptive road speed controller (ACC), a speed limitation, a driving stability control, an engine drag torque control and/or a drive slip control. These engine-independent input quantities, which are to be assigned to the output, define output torques or transmission output torques and are coordinated on this level.

The resulting desired quantity of the first coordination stage is supplied together with second desired quantities to a second coordination stage. In the known embodiment, these second desired quantities are engine-dependent quantities, especially desired values of internal torque limitations, for example: for reasons of component protection; for reasons of too-lean protection at full load; a desired value for a maximum rpm limitation, et cetera. The resultant of the second coordination stage is a desired value for the adjustment of the drive unit which, in the case of an internal combustion engine, is converted for the engine-specific actuating paths.

The described subdivision is a preferred example. In other embodiments, other decentral subdivisions are undertaken.

Figure 2:
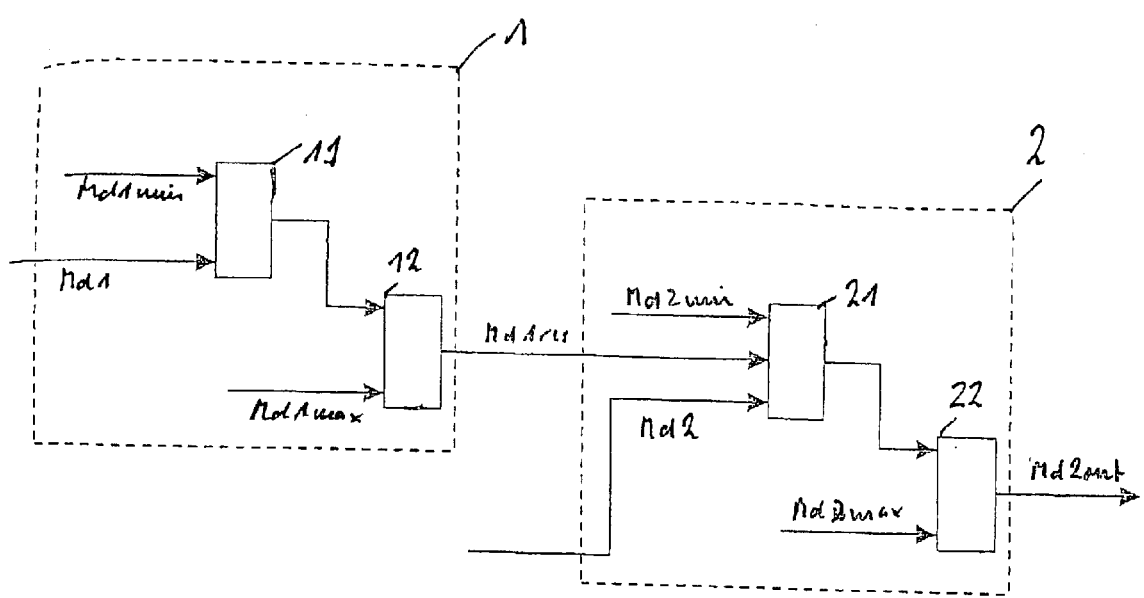
FIG. 2 shows a sequence diagram of a decentral coordination of requests to a drive unit and the above-mentioned problems are illustrated in this example.

FIG. 2 shows an example of such a decentral torque coordination. FIG. 2 is a sequence diagram and the individual blocks describe programs or subprograms and the connecting arrows show the flow of information. The decentral torque coordination comprises a first coordinator 1 (first coordination stage) and a downstream second coordinator 2 (second coordination stage). An input quantity MD1, for example, a driver command desired torque, is supplied to the coordinator 1. This input quantity MD1 is logically coupled in a maximum value stage 11 with a pregiven, if needed, stored minimum value MD1MIN which is, for example, a minimum torque pregiven by an electronic stability program. The larger of the two values is then supplied to a minimum selection stage 12 wherein the resulting value of stage 11 is coupled to a maximum value MD1MAX. This maximum value MD1MAX is, for example, a maximum value which is pregiven from a speed limiting. Then, the smaller of the two values is transmitted to the second coordinator 2 as resulting value MD1RES. There, the resulting value of the coordinator 1 is supplied to a maximum value selection stage 21. A further input quantity MD2, for example, the desired torque of an engine drag torque controller, is supplied to the maximum value selection stage 21. Furthermore, the minimum value MD2MIN (for example, a minimum value derived from an idle controller) is supplied to the maximum value selection stage 21. The larger of these values is supplied as a resultant to a minimum value selection stage 22 to which additionally a maximum value MD2MAX is supplied which can, for example, be derived from a maximum rpm limitation. The output quantity MD2OUT is formed as the smaller of the two values of the minimum selection stage 22 and is outputted. In dependence upon the output value, the drive unit is adjusted or the output value is supplied to a further coordination stage as an input quantity.

In a decentralized torque coordination as described above, the following unsatisfactory situation can occur. The following numerical example makes the problem clear. If, for example, MD1MIN is 100 Nm, MD1MAX is 200 Nm and MD1 is 250 Nm, then the output quantity of the coordinator 1 is 200 Nm, namely, the larger of the values of MD1 and MD1MIN and the smaller of the resultants (MD1, MD1MIN) and MD1MAX. In the coordinator 2, the 200 Nm (resultant of the first coordination) is coupled to MD2MIN (in the example 100 Nm) and coupled to the input quantity MD2 (250 Nm) in the maximum value selection stage 21. The output quantity is 250 Nm which is evaluated in the minimum value selection stage 22 with the maximum value MD2MAX which is assumed as 300 Nm. The smaller value, namely 250 Nm, is outputted. One can see clearly that the output value of the second coordination violates the maximum value of the first coordination. If this maximum value, for example, was responsible for the protection of a component, then this component protection could no longer be guaranteed.

For these reasons, as described hereinafter with respect to the sequence diagram of FIG. 3, in a decentral torque coordination it is provided to also transmit the torque limits in addition to the desired quantities (desired torques) as a result of a coordination stage and to consider these torque limits in the downstream coordinators. A function block for a coordination (coordinator, coordination stage) accordingly comprises the following individual parts: coordination of the input quantities (torque request, desired torque values), coordination of the lower limits (torque limits, limit torque values) and coordination of the upper limits (torque limits, limit torque values).

Figure 3:
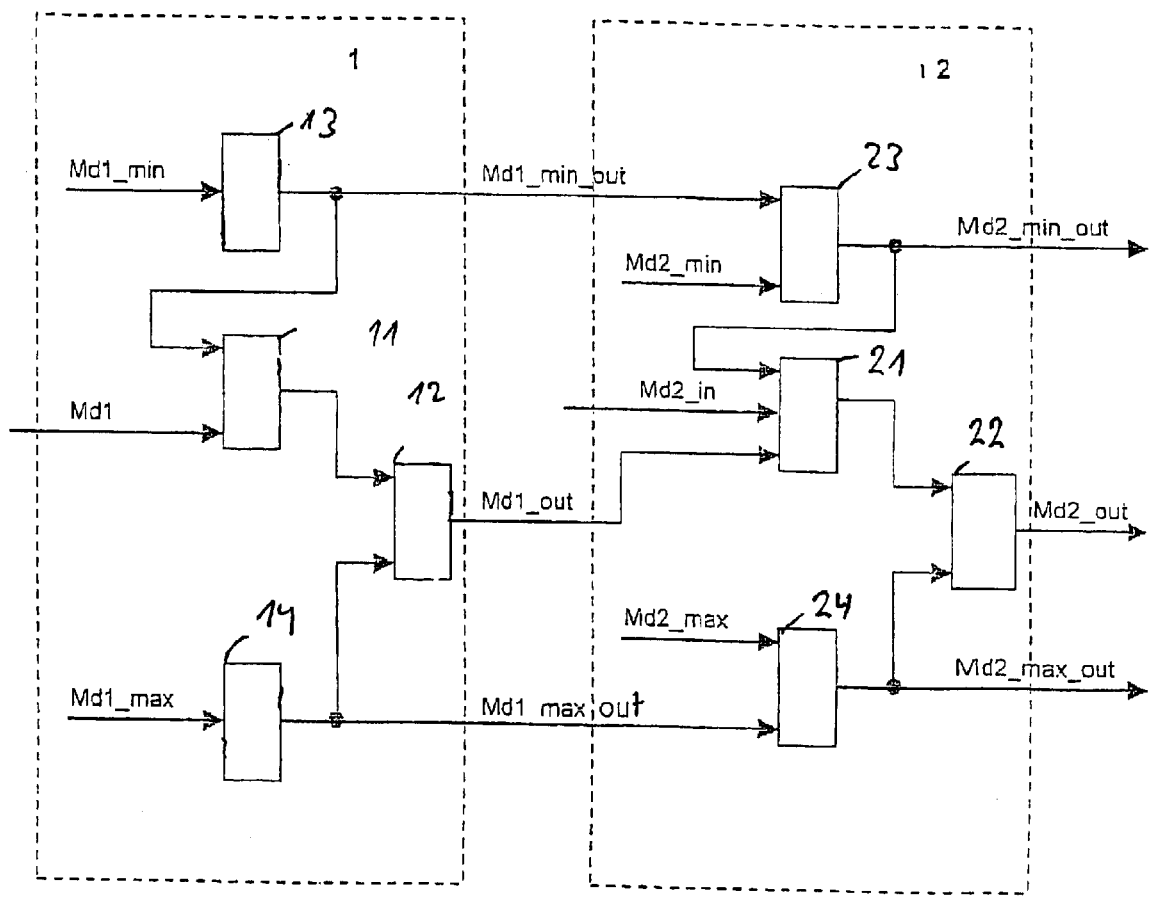
FIG. 3 outlines a sequence diagram which shows a decentral coordination of input quantities, especially of desired torque values wherein, in addition to resulting input quantities of each coordination stage, also limit values are transmitted.

In FIG. 3, a sequence diagram is shown wherein these requirements are converted. Here too, coordinators 1 and 2 are provided. The individual blocks describe programs or subprograms and the connecting arrows show the flow of information. An input quantity (desired torque value) MD1 is supplied to the coordinator 1 as shown with respect to the example in FIG. 2. Internal minimum and maximum values (MD1MIN and MD1MAX) are also present. In addition to the procedure already described in FIG. 2 of the maximum value selection between input quantity MD1 and minimum quantity MD1MIN in the maximum value selection stage 11 as well as the minimum value selection between the resultant of the maximum value selection 11 and the maximum value torque MD1MAX in the minimum value selection stage 12, the following special features are provided. The result of the minimum value selection in 12 is outputted as MD1OUT to the second coordinator. In addition to this resulting desired torque MD1OUT, a minimum value MD1MINOUT and a maximum value MD1MAXOUT are transmitted to the coordinator 2. With only a limit quantity each, these output quantities correspond to the present quantity. In one embodiment, several minimum and/or maximum values are present in a coordinator. In this case, the transmitted minimum and/or maximum values as well as the values, which form the basis of the selections 11 and 12, are, in the case of the minimum values, the result of a maximum value selection 13 from several minimum values and, in the case of maximum values, they are the result of a minimum value selection 14 from several maximum values.

If only one or several maximum values are present or only one or several minimum values are present, then, in this embodiment, also only one limit value is transmitted.

In the coordinator 2, the transmitted minimum value MD1MINOUT is coupled in a maximum value selection stage 23 to the minimum value MD2MIN (if needed, also to several) which is present in the coordinator. The largest of the values is supplied to the maximum value selection stage 21 and, if required, is transmitted to the next coordinator as output quantity MD2MINOUT. In the maximum value selection stage 21, the largest of the supplied values is transmitted further as a resulting torque desired value. The supplied quantities are, in addition to the determined minimum value MD2MINOUT, the input quantity MD2IN of the second coordinator and the transmitted resulting quantity MD1OUT of the first coordinator. In addition, a minimum value selection stage 24 is provided wherein the maximum values are coordinated. On the one hand, the transmitted resulting maximum value MD1MAXOUT of the first coordinator as well as one or several maximum quantities present in the second coordinator MD2MAX are supplied to this stage 24. The resulting maximum value MD2MAXOUT is supplied to the minimum value selection stage 22 and, if required, is outputted to a downstream coordinator. The resulting quantity of the maximum value selection stage 21 is also supplied to the minimum value selection stage 22. The lowest of the two supplied values is outputted as output quantity MD2OUT to a further coordinator and/or to adjust the drive unit and/or for further processing.

A numerical example shows that, with this procedure, the output quantity MD2OUT does not violate the limit values even of the first coordination stage. If MD1MIN is 100 Nm and MD1MAX is 200 Nm and MD1 is 250 Nm, then the following are transmitted to the second coordinator: MD1OUT 200 Nm, MD1MAXOUT 200 Nm and MD1MINOUT 100 Nm. If MD2MIN is 100 Nm, MD2MAX is 300 Nm and MD2 is 250 Nm, then the following result as output quantities: MD2OUT 200 Nm, MD2MAXOUT 200 Nm and MD2MINOUT 100 Nm. Here, it can be seen that MD2OUT at 200 Nm neither goes beyond the minimum value MD1MIN nor the maximum value MD1MAX.

The illustrated embodiment shows only one possible realization. In other embodiments, a minimum value coordination can be omitted, for example, in coordinator 1 or, several quantities can be coupled in the selection stages, especially several input quantities or, between the coordinators, a transformation of the transmitted values to another torque level takes place, for example, from a transmission output torque into an engine output torque or from an engine output torque into an indicated torque, in correspondence to the initially-mentioned state of the art.

What is claimed is:

1. A method for controlling a drive unit wherein input quantities and maximum quantities and/or minimum quantities for these input quantities are pregiven, the method comprising the steps of:

coordinating at least one first input quantity with at least one first minimum quantity and at least one first maximum quantity in the context of a first coordination;

transmitting the resulting input quantity and the minimum quantity and the maximum quantity to a second coordination; and, in said second coordination, coupling at least one further input quantity to the resulting input quantity to form a resulting quantity while considering at least one minimum quantity and at least one maximum quantity.

2. The method of claim 1, wherein the input quantities and the minimum or maximum quantities are torques of a drive unit.

3. The method of claim 1, comprising the further step of coupling the transmitted minimum quantity or the transmitted maximum quantity to an additional minimum quantity or maximum quantity, respectively, in said second coordination to form a resulting minimum quantity or maximum quantity.

4. The method of claim 1, comprising the further step of coupling, in the second coordination, the additional input quantity; and, the resulting input quantity as well as the transmitted minimum quantity or a minimum quantity derived from the transmitted minimum quantity or the transmitted maximum quantity or a maximum quantity derived from the transmitted maximum quantity being coupled.

5. The method of claim 1, wherein the transmitted quantities are transformed.

6. An arrangement for controlling a drive unit with at least two coordinators to which at least one input quantity is supplied and in which this at least one input quantity is coupled to at least one maximum quantity and/or at least one minimum quantity to form a resulting input quantity, the arrangement comprising:

each of the coordinators including: an element for coordinating input quantities, a coordination of minimum limit values and a coordination of maximum limit values; and, a downstream coordinator which receives at least one resulting input quantity, maximum quantity and minimum quantity from an upstream coordinator.

7. A method for controlling a drive unit wherein input quantities and maximum quantities and/or minimum quantities for these input quantities are pregiven, the method comprising the steps of:

coordinating at least one first input quantity with at least one first minimum quantity and at least one first maximum quantity in the context of a first coordination;

transmitting the resulting input quantity and the minimum quantity and the maximum quantity to a second coordination; and, in said second coordination, coupling at least one further input quantity to the resulting input quantity to form a resulting quantity while considering at least one minimum quantity or at least one maximum quantity.

8. The method of claim 7, wherein the input quantities and the minimum or maximum quantities are torques of a drive unit.

9. The method of claim 7, comprising the further step of coupling the transmitted minimum quantity or the transmitted maximum quantity to an additional minimum quantity or maximum quantity, respectively, in said second coordination to form a resulting minimum quantity or maximum quantity.

10. The method of claim 7, comprising the further step of coupling, in the second coordination, the additional input quantity; and, the resulting input quantity as well as the transmitted minimum quantity or a minimum quantity derived from the transmitted minimum quantity or the transmitted maximum quantity or a maximum quantity derived from the transmitted maximum quantity being coupled.

11. The method of claim 7, wherein the transmitted quantities are transformed.

12. A method for controlling a drive unit wherein input quantities and maximum quantities and/or minimum quantities for these input quantities are pregiven, the method comprising the steps of:

coordinating at least one first input quantity with at least one first minimum quantity or at least one first maximum quantity in the context of a first coordination;

transmitting the resulting input quantity and the minimum quantity or the maximum quantity to a second coordination; and, in said second coordination, coupling at least one further input quantity to the resulting input quantity to form a resulting quantity while considering at least one minimum quantity and at least one maximum quantity.

13. The method of claim 12, wherein the input quantities and the minimum or maximum quantities are torques of a drive unit.

14. The method of claim 12, comprising the further step of coupling the transmitted minimum quantity or the transmitted maximum quantity to an additional minimum quantity or maximum quantity, respectively, in said second coordination to form a resulting minimum quantity or maximum quantity.

15. The method of claim 12, comprising the further step of coupling, in the second coordination, the additional input quantity; and, the resulting input quantity as well as the transmitted minimum quantity or a minimum quantity derived from the transmitted minimum quantity or the transmitted maximum quantity or a maximum quantity derived from the transmitted maximum quantity being coupled.

16. The method of claim 12, wherein the transmitted quantities are transformed.

17. A method for controlling a drive unit wherein input quantities and maximum quantities and/or minimum quantities for these input quantities are pregiven, the method comprising the steps of:

coordinating at least one first input quantity with at least one first minimum quantity or at least one first maximum quantity in the context of a first coordination;

transmitting the resulting input quantity and the minimum quantity or the maximum quantity to a second coordination; and, in said second coordination, coupling at least one further input quantity to the resulting input quantity to form a resulting quantity while considering at least one minimum quantity or at least one maximum quantity.

18. The method of claim 17, wherein the input quantities and the minimum or maximum quantities are torques of a drive unit.

19. The method of claim 17, comprising the further step of coupling the transmitted minimum quantity or the transmitted maximum quantity to an additional minimum quantity or maximum quantity, respectively, in said second coordination to form a resulting minimum quantity or maximum quantity.

20. The method of claim 17, comprising the further step of coupling, in the second coordination, the additional input quantity; and, the resulting input quantity as well as the transmitted minimum quantity or a minimum quantity derived from the transmitted minimum quantity or the transmitted maximum quantity or a maximum quantity derived from the transmitted maximum quantity being coupled.

21. The method of claim 17, wherein the transmitted quantities are transformed.

22. An arrangement for controlling a drive unit with at least two coordinators to which at least one input quantity is supplied and in which this at least one input quantity is coupled to at least one maximum quantity and/or at least one minimum quantity to form a resulting input quantity, the arrangement comprising:

each of the coordinators including: an element for coordinating input quantities, a coordination of minimum limit values or a coordination of maximum limit values; and, a downstream coordinator which receives at least one resulting input quantity maximum quantity or minimum quantity from an upstream coordinator.

* * * * *

UNITED STATES PATENT AND TRADEMARK OFFICE
CERTIFICATE OF CORRECTION

PATENT NO. : 6,901,910 B2
DATED : June 7, 2005
INVENTOR(S) : Werner Hess, Juergen Pantring and Dirk Hartmann It is certified that error appears in the above-identified patent and that said Letters Patent is hereby corrected as shown below:

<u>Column 8,</u>
Line 40, delete the first "quantity" and substitute -- quantity, -- therefor.

Signed and Sealed this

Sixteenth Day of August, 2005

JON W. DUDAS
*Director of the United States Patent and Trademark Office*